United States Patent Office 3,455,872
Patented July 15, 1969

3,455,872
WATER SENSITIVE SILICONE RUBBER
Henry Nelson Beck, Walnut Creek, Calif., assignor to Dow Corning Corporation, Midland, Mich., a corporation of Michigan
No Drawing. Filed June 21, 1965, Ser. No. 465,780
Int. Cl. C08g 47/10, 51/04
U.S. Cl. 260—41       12 Claims

ABSTRACT OF THE DISCLOSURE

A water sensitive silicone rubber is disclosed in which the composition is an organosiloxane polymer, polyvinylpyrrolidone, and a vulcanizing agent; preferably the composition contains a silica filler.

---

This invention relates to a water sensitive silicone rubber. More particularly, this invention relates to a water sensitive silicone rubber comprising silicone rubber and polyvinylpyrrolidone.

Silicone rubber is well known as a hydrophobic rubber. The hydrophobic property of silicone rubber makes it useful in applications in which water is to be excluded, such as electrical wire coverings. There is also a need for a silicone rubber which is sensitive to water.

It is an object of this invention to provide a water sensitive silicone rubber. Another object is to provide a silicone rubber which swells in water to provide a seal. These and other objects will be apparent from the following detailed description and the appended claims.

This invention relates to a water sensitive silicone rubber stock consisting essentially of (A) an organosiloxane polymer consisting essentially of diorganosiloxane units, having a ratio of from 1.9 to 2.0 organic radicals per silicon atom, the organic radicals being selected from the group consisting of monovalent hydrocarbon radicals and monovalent halohydrocarbon radicals, and (B) polyvinylpyrrolidone in an amount of from 5 to 50 weight percent based on the combined weight of (A) and (B), and (C) a vulcanizing agent.

The water sensitive silicone rubber stock is prepared by thoroughly mixing a diorganosiloxane polymer with polyvinylpyrrolidone and then curing with a vulcanizing agent.

The organosiloxane polymer can be any conventional diorganosiloxane polymer which is used in making silicone rubbers. These diorganosiloxanes are well known in the art and can be purchased commercially. Preferably, the diorganosiloxane polymer has organic radicals which are predominantly methyl radicals and also includes ethyl, vinyl, phenyl and propyl. The best polymers are obtained when the organic radicals contain from 0.01 to 10 vinyl radicals per 100 organic radicals. Organic radicals can be monovalent hydrocarbon radicals such as methyl, ethyl, propyl, butyl, hexyl, octadecyl, vinyl, allyl, phenyl, benzyl, tolyl, xenyl, hexenyl, cyclopentyl, cyclohexyl, naphthyl, alkylnaphthyl and hexynyl; and monovalent halohydrocarbon radicals, such as chloromethyl, chlorophenyl, chlorotolyl, 3,3,3-trifluoropropyl, perfluorovinyl, α,α,α-trifluorotolyl, 2,4-dichlorobenzyl, 4'-bromoxenyl and chlorohexyl. The ratio of the organic radicals to the silicon atoms is from 1.9 to 2.0 organic radicals per silicon atom, and preferably from 1.98 to 2.00.

The diorganosiloxane polymers can have a wide variety of molecular weights, depending upon the curing system to be employed. The diorganosiloxane polymers can be cured with conventional peroxide catalyst or with conventional room temperature vulcanization systems. The peroxide vulcanized systems are preferred when the diorganosiloxane polymers have a molecular weight such that the viscosity is greater than 1,000,000 cs. at 25° C. and preferably greater than 2,000,000 cs. at 25° C. The diorganosiloxane polymers cured by room temperature vulcanization systems can have viscosities as low as 500 cs. at 25° C. All of the diorganosiloxane polymers are benzene soluble.

The polyvinylpyrrolidone (B) used in this invention can be any polymerized vinylpyrrolidone having from 300 to 25,000 vinylpyrrolidone units per molecule, preferably from 500 to 10,000 units per molecule. The amount of polyvinylpyrrolidone operable is from 5 to 50 weight percent based on the weight of the diorganosiloxane polymer and the polyvinylpyrrolidone, preferably from 5 to 30 weight percent. The amount of polyvinylpyrrolidone used influences the water sensitivity of the cured polymer.

The vulcanizing agent can be any conventional vulcanizing agent used in the silicone rubber art. Preferably, the vulcanization agent is a peroxide catalyst such as benzoyl peroxide, 2,4-dichlorobenzoyl peroxide, 2,5-bis(tert-butylperoxy)-2,5-dimethylhexane, dicumyl peroxide and tert-butylperbenzoate. The amount of peroxide catalyst can vary from 0.1 to 10 weight percent of the diorganosiloxane polymer. The type of vulcanizing agent depends upon the siloxane polymer system used.

The water sensitive silicone rubber stocks of this invention preferably contain a conventional silica filler. The silica filler can be present in amounts up to 100 weight percent based on the combined weight of the diorganosiloxane polymer and the polyvinylpyrrolidone, preferably from 5 to 75 weight percent.

Other additives conventionally used in silicone rubbers can be added, such as heat stability additives, plasticizers, antioxidants, compression set additives, colorants germicides and fungicides and other fillers.

The water sensitive silicone rubber stocks can be compounded in any conventional manner which provides for through mixing of the ingredients to provide a consistent composition throughout. The stocks can be milled on cold or heated mills, but care should be taken when heated mills are used not to exceed the decomposition point of the polyvinylpyrrolidone. Mixing can also be done with other mixing devices or by hand if fluidity permits. The order of mixing the ingredients is not critical except when a heated mill is used. Mixtures containing the vulcanizing agent must not be heated, although the mixture absent of the vulcanizing agent can be mixed with heating.

The water sensitive silicone rubber stock is vulcanized by heating when a peroxide vulcanization agent is used. The stocks can be heated up to 150° C. until cured. Short vulcanization times at higher temperatures can also be used, but care should be used not to decompose the polyvinylpyrrolidone. Room temperature curing systems do not require heating for curing, but these stocks can also be heated to hasten the cure time, if desired.

The water sensitive silicone rubbers can be used in medical applications. Many of the silicone rubbers have been used as inplants. These silicone rubber inplants are so inert to tissue that some means of anchoring them in place is required. The water sensitive silicone rubbers can be used by vulcanizing a layer of the water sensitive silicone rubber to conventional silicone rubber inplants. The water sensitive silicone rubber will anchor the silicone rubber to the tissue eliminating the need for other anchoring means.

The water sensitive silicone rubber can be used to study hypertension in animals. A sheath of the water sensitive silicone rubber is placed around a blood vessel and as the silicone rubber swells in the aqueous medium the blood vessel becomes constricted. Other medical uses are medicinal capsules to be implanted in tissue to permit the slow release of a medicine for a continuous supply over a long period of time.

There are many other utilities besides those in the biological area. The water sensitive silicone rubber can be used to provide a temporary seal in a radiator of a water cooled engine. The water sensitive silicone rubber can be placed in the hole of a radiator and it will then swell to provide a water and/or coolant seal. The silicone rubber provides a heat resistant plug which will withstand the coolant temperatures encountered. Inasmuch as other polar materials will swell this water sensitive silicone rubber, most coolants will swell the silicone rubber of this invention to provide a seal. This water sensitive silicone rubber used to seal holes in the radiators of water cooled engines is particularly useful for armored vehicles. The armored vehicles may develop leaks in the radiators due to rough terrain, explosions, bullets, etc. and thus become useless until repairs can be made. The water sensitive silicone rubber provides a plug which will seal the radiator until such repairs can be made. The vulcanized water sensitive silicone rubber can be cut to a size to fit any hole and when placed in the hole it will swell and provide a tight seal.

The water sensitive silicone rubber can also be used as an innersole for footwear. The water sensitive silicone rubber will absorb the moisture from the feet and if the footwear is so constructed as to provide a portion of the surface of the water sensitive silicone rubber in contact with the outside atmosphere, the moisture will be transmitted away from the feet to the atmosphere, thus cooling the feet and at the same time keeping them dry to prevent the growth of bacteria and fungus. The water sensitive silicone rubber is flexible and provides for a good cushion effect.

Many other utilities will occur to those skilled in the art of silicone rubber, such as a caulking compound for boats. The water sensitive silicone rubber is clear when swollen, is biologically inert and will transmit gases and polar fluids.

The following examples are illustrative only and do not limit the scope of this invention which is properly delineated in the appended claims.

Example 1

A water sensitive silicone rubber was prepared by mixing the following ingredients on a cold 2-roll mill: 10.0 g. of a dimethylpolysiloxane gum having 99.858 mol percent dimethylsiloxane units and 0.142 mol percent methylvinylsiloxane units, 3.5 g. of a silica filler, 1 ml. of a dimethylpolysiloxane having 3.5 weight percent silicon-bonded hydroxyl groups, 5.0 g. of polyvinylpyrrolidone, 0.3 g. of benzoyl peroxide. A sample was premolded in a chase for 5 minutes at 130° C. and at 16,000 p.s.i. and then cured in air at 150° C. for one hour. The cured rubber had a tensile strength of 307 p.s.i., a elongation of 457 percent and a durometer of 60. The sample when immersed in water for 24 hours had a swell volume of 44 percent as calculated from the equation $$\text{Percent } S_v = \left[\left(\frac{\text{length swollen}}{\text{original length}}\right)^3 - 1\right]100$$

and absorbed 38 percent water by weight.

Example 2

When the following compositions are prepared and cured as in Example 1, water sensitive silicone rubbers are produced.

A

| | G. |
|---|---|
| Dimethylpolysiloxane having 95 mol percent dimethylsiloxane units and 5 mol percent methylvinylsiloxane units | 55 |
| Polyvinylpyrrolidone having an average molecular weight of 80,000 | 45 |
| Fume silica | 40 |
| Benzoyl peroxide | 4 |

B

| | G. |
|---|---|
| Polysiloxane having 70 mol percent dimethylsiloxane units, 20 mol percent phenylmethylsiloxane units and 10 mol percent methylvinylsiloxane units | 70 |
| Polyvinylpyrrolidone having an average molecular weight of 134,000 | 30 |
| Silica aerogel | 70 |
| Phenylmethylsiloxane fluid having 4.1 weight percent silicon-bonded hydroxyl groups | 5 |
| 2,4-dichlorobenzoyl peroxide | 5 |

C

| | G. |
|---|---|
| Dimethylpolysiloxane having a viscosity of 5,000,000 cs. at 25° C. and having 99 mol percent dimethylsiloxane units and 1 mol percent methylallylsiloxane units | 95 |
| Polyvinylpyrrolidone having an average molecular weight of 1,000,000 | 5 |
| Fume silica | 38 |
| 2,5-bis(tert-butylperoxy)-2,5-dimethylhexane | 0.3 |

D

| | G. |
|---|---|
| Polysiloxane having a viscosity of $3.5 \times 10^6$ cs. at 25° C. and having 65 mol percent dimethylsiloxane units, 20 mol percent of methylethylsiloxane units, 0.5 mol percent of methylvinylsiloxane units, 4.5 mol percent of xenylmethylsiloxane units and 10 mol percent hexylmethylsiloxane units | 75 |
| Polyvinylpyrrolidone having an average molecular weight of 31,000 | 25 |
| Silica | 20 |
| Dicumyl peroxide | 3 |

Example 3

When 70 g. of a mixture of 100 parts of a 10,000 cs. (at 25° C.) hydroxy-endblocked dimethylpolysiloxane, 10 parts of methyltriacetoxysilane, 40 parts of 1000 cs. (at 25° C.) trimethylsiloxy-endblocked dimethylpolysiloxane, 14 parts of a fume silica and 0.25 part of dibutyltin diacetate and 30 g. of a polyvinylpyrrolidone having an average molecular weight of 765,000 are mixed thoroughly and allowed to stand at room temperature for 24 hours, a water sensitive silicone rubber is obtained.

Example 4

When 80 g. of a 3,3,3-trifluoropropylmethylpolysiloxane gum having a viscosity of 4,000,000 cs. at 25° C., 20 g. of polyvinylpyrrolidone, 35 g. of silica and 4 g. of tert-butylperbenzoate are thoroughly mixed on a cold 2-roll mill and then molded and heated to 145° C. for 4 hours a water sensitive silicone rubber is obtained.

That which is claimed is:

1. A water sensitive silicone rubber stock consisting essentially of
    (A) an organosiloxane polymer consisting essentially of diorganosiloxane units, having a ratio of from 1.9 to 2.0 organic radicals per silicon atom, the organic radicals being selected from the group consisting of monovalent hydrocarbon radicals and monovalent halohydrocarbon radicals,
    (B) polyvinylpyrrolidone in an amount of from 5 to 50 weight percent based on the combined weight of (A) and (B), and
    (C) a vulcanizing agent.

2. The water sensitive silicone rubber stock of claim 1, in which a silica filler is present.

3. The water sensitive silicone rubber stock of claim 2 in which the polyvinylpyrrolidone is present in an amount of from 5 to 30 weight percent.

4. The water sensitive silicone rubber stock of claim 3 in which the organosiloxane polymer has methyl and vinyl radicals and said vinyl radicals are present from 0.01 to 10 vinyl radicals per 100 methyl and vinyl radicals.

5. The water sensitive silicone rubber stock of claim 4 in which the polyvinylpyrrolidone has from 300 to 10,000 vinylpyrrolidone units per molecule.

6. The water sensitive silicone rubber stock of claim 5 in which the silica filler is present in an amount from 5 to 75 weight percent based on the combined weight of (A) and (B).

7. The water sensitive silicone rubber stock of claim 6 in which the vulcanizing agent is an organic peroxide for silicone rubber stocks.

8. A water sensitive silicone rubber consisting essentially of a cured solid of
 (A) an organosiloxane polymer consisting essentially of diorganosiloxane units, having a ratio of from 1.9 to 2.0 organic radicals per silicon atom, the organic radicals being selected from the group consisting of monovalent hydrocarbon radicals and monovalent halohydrocarbon radicals, and
 (B) polyvinylpyrrolidone in an amount of from 5 to 50 weight percent based on the combined weight of (A) and (B).

9. The water sensitive silicone rubber of claim 8 in which a silica filler is present.

10. The water sensitive silicone rubber of claim 9 in which the polyvinylpyrrolidone is present in an amount from 5 to 30 weight percent.

11. The water sensitive silicone rubber of claim 10 in which the organosiloxane polymer has methyl and vinyl radicals and said vinyl radicals are present from 0.01 to 10 vinyl radicals per 100 methyl and vinyl radicals.

12. The water sensitive silicone rubber of claim 11 in which the silica filler is present in an amount from 5 to 75 weight percent based on the combined weight of (A) and (B).

References Cited

UNITED STATES PATENTS

| 3,082,183 | 3/1963 | Royd. | |
| 3,210,208 | 10/1965 | Grass et al. | 260—827 X |
| 3,294,861 | 12/1966 | Simpson | 260—827 |

MORRIS LIEBMAN, Primary Examiner

L. T. JACOBS, Assistant Examiner

U.S. Cl. X.R.

260—37, 827